US011407668B1

(12) United States Patent
Mitchell et al.

(10) Patent No.: US 11,407,668 B1
(45) Date of Patent: Aug. 9, 2022

(54) METHOD FOR PROCESSING SLUDGE (71) Applicant: Ecolab USA Inc., St. Paul, MN (US)

(72) Inventors: David B. Mitchell, Yardley, PA (US); Petia Todorova Tontcheva, Schaumburg, IL (US)

(73) Assignee: ECOLAB USA INC., St. Paul, MN (US)

(*) Notice: Subject to any disclaimer, the term of this patent is extended or adjusted under 35 U.S.C. 154(b) by 422 days.

(21) Appl. No.: 15/427,574

(22) Filed: Feb. 8, 2017

Related U.S. Application Data

(60) Provisional application No. 62/292,656, filed on Feb. 8, 2016.

(51) Int. Cl.
C02F 11/12 (2019.01)
C02F 11/121 (2019.01)
C02F 1/24 (2006.01)
C02F 1/52 (2006.01)
C02F 11/14 (2019.01)

(52) U.S. Cl.
CPC .............. C02F 11/121 (2013.01); C02F 1/24 (2013.01); C02F 1/52 (2013.01); C02F 11/14 (2013.01)

(58) Field of Classification Search
CPC .................................... C02F 11/121
See application file for complete search history.

(56) References Cited

U.S. PATENT DOCUMENTS 5,624,550 A     4/1997  Iji et al.
6,964,737 B2   11/2005  Abu-Orf et al.
2006/0011540 A1* 1/2006 Pressley ............... B01F 5/0413
                                                210/613
2009/0107920 A1* 4/2009 Ward .................... C02F 1/008
                                                210/710
2010/0147774 A1* 6/2010 Morgan ................. C02F 1/68
                                                210/749
2010/0331484 A1* 12/2010 Swift .................... C08L 61/32
                                                524/595
2013/0067973 A1* 3/2013 Ward .................... B01F 3/1214
                                                71/12
2013/0075341 A1* 3/2013 Davis ................... B01D 17/048
                                                210/727
2013/0336877 A1* 12/2013 Soane .................... C02F 1/56
                                                423/580.1

OTHER PUBLICATIONS

Hu et al., "Influence of dispersant on rheological properties of dewatered sludge," From Huanjing Kexue Yu Jishu (2010), 33(7), 61-64. | Language: Chinese, Database: CAPLUS Naphthalenesulfonate; Sodium potassium tartrate.
Nalco, an Ecolab Company, "MD and VA on Site Shearing Study," (2014).
Barnes, "Thixotropy—a review," J. Non-Newtonian Fluid Meeh., 70 (1997) 1-33.

* cited by examiner

*Primary Examiner* — Peter Keyworth
(74) *Attorney, Agent, or Firm* — Merchant & Gould P.C.

(57) ABSTRACT

A method for treating wastewater or sludge includes treating a sludge having a first viscosity of from about 3,000 cP to about 15,000 cP by shearing the sludge to obtain a treated sludge having a second viscosity of less than 3,000 cP, where the second viscosity persists for a period of time. The sludge may be thickened by dewatering. A chemical agent may be added to the thickened sludge during, before, or after shearing. The treated sludge may further be pumped, transported, or otherwise handled.

18 Claims, 5 Drawing Sheets

METHOD FOR PROCESSING SLUDGE

CROSS REFERENCE TO RELATED APPLICATION

This application claims the benefit of U.S. Provisional Application Ser. No. 62/292,656 filed Feb. 8, 2016, which is incorporated by reference herein in its entirety.

FIELD

The present disclosure relates to compositions, methods, and systems for processing wastewater and sludge streams.

BACKGROUND

Wastewater is typically treated to remove contaminants that would otherwise contaminate receiving waters or prevent reuse of the water in industrial processes. Treatments for wastewater can include, for example, removal of suspended solids, biodegradables, pathogens, heavy metals and other inorganic hazardous elements or compounds, macronutrients (e.g., nitrogen and phosphorus), recalcitrant organics, xenobiotic hazardous compounds, and compounds such as endocrine disruptors and nanomaterials. Wastewater treatment can address concerns related to public safety, public health, and fitness for future uses of the treated wastewater.

When suspended solids are removed from the wastewater stream, the solids can be recovered as a sludge, which may be disposed or used, for example, as a fertilizer. Two contradictory problems manifest when attempting to economically dispose of various wastewaters. First, high water content increases mass and bulk, which in turn increases the cost of transport. De-watering of the sludge reduces transport costs, but increases viscosity, making pumping, loading, and unloading difficult.

It is against this background that the present disclosure is made.

SUMMARY

A method for treating wastewater or sludge includes treating a sludge having a first viscosity of from about 3,000 cP to about 20,000 cP by shearing the sludge to obtain a treated sludge having a second viscosity of less than 3,000 cP, where the second viscosity persists for a period time. The sludge may be thickened by dewatering. A chemical agent may be added to the thickened sludge during, before, or after shearing. The treated sludge may further be pumped, transported, or otherwise handled.

DETAILED DESCRIPTION

As used here, the term "viscosity" represents a fluid's (e.g., liquid's) resistance to gradual deformation by shear stress or tensile stress. Viscosity can be understood as the "thickness" of a fluid, or the inverse of flowability. Viscosity is typically measured using a substantially homogeneous sample of the fluid. If the sample of fluid includes two or more distinct phase layers, the viscosity is measured as the overall weighted viscosity of all the phases within the sample. Viscosity can be measured using a viscometer or rheometer. The unit used for viscosity here is centipoise (cP).

"Equilibrium viscosity" is used to refer to the viscosity of the sample at rest, e.g., before any significant mixing or other disturbance of the sample that could alter the viscosity of the sample. If a sample is mixed or otherwise disturbed, it can be allowed to rest until it returns to its equilibrium viscosity.

"Proportion of sheared viscosity" or "PSV" or is a calculated value used to indicate the effect of a given process (e.g., shearing) on the viscosity of a test sample relative to a control sample. Low PSV values indicate high reduction in viscosity. PSV can be calculated as PSV=viscosity of test sample/viscosity of control sample.

"Thixotropy" means a time dependent change in a material's viscosity. Thixotropic fluids or gels exhibit a reduction in viscosity when stirred or otherwise agitated. Thixotropic fluids typically return to their initial viscosity after a period of time once the agitation has stopped. Many gels and colloids are thixotropic materials, exhibiting a stable form at rest, but becoming fluid when agitated.

"Wastewater" is used broadly to refer to any aqueous or non-aqueous waste stream from municipal, industrial, agricultural, or other sources. Examples of wastewater include industrial wastewater (e.g., industrial process waters, chemical wastewater, refining wastewater, washing water, rinse water, brine, slurry, surplus manufactured liquids, industrial site drainage, industrial cooling waters, waste from food manufacturing, restaurant liquid waste, organic or non-biodegradable/difficult-to-treat waste (e.g., from pharmaceutical or pesticide manufacturing), extreme pH waste (e.g., from acid/alkali manufacturing, metal plating), toxic waste (e.g., from metal plating, cyanide production, pesticide manufacturing, etc.), paper manufacturing waste, hydraulic fracturing fluids, produced water from oil & natural gas production, etc.); municipal wastewater (e.g., water containing human waste, black water, gray water, cesspit water, septic tank water, sewage treatment plant fluids, washing water, rain water drainage, storm sewer drainage, urban rainfall runoff); mining wastewater (silt, brine, slurry, high or extreme pH waste, toxic waste, etc.); agricultural wastewater (animal waste, agricultural drainage and runoff, excess or waste agricultural chemicals (e.g., pesticides, used motor oils, etc.), silt, brine, etc.); collected rainwater, seawater ingress, river water ingress, road/highway drainage, organic or biodegradable waste, solids and emulsions (for example from foodstuffs, lubricating and hydraulic oil manufacturing, etc.), and any combination thereof.

"Sludge" is used broadly to refer to a viscous mixture of solid particles and liquid (e.g., water, an aqueous mixture, or a non-aqueous liquid) that retains some fluidity. Sludge may have a solids content of 1% or higher and a viscosity of at least 200 cP. For example, a more concentrated sludge may have a viscosity as high as 3,000-10,000 cP or higher. Sludge may be derived from an industrial process stream or a water treatment process.

"Shear" and "Shearing" are used to refer to the application of a mechanical force against a material causing a plastic shear strain (e.g., an irreversible deformation) in the material.

Shearing of a fluid may cause a change in rheology, a decrease in viscosity (sometimes also referred to as "shear thinning") or an increase in plasticity or pseudo plasticity of the material.

"EPI-DMA" is used to refer to epichlorohydrin-dimethylamine polymer, a copolymer comprising epichlorohydrin and dimethylamine repeating subunits. EPI-DMA may be crosslinked, for example with ammonia. It may have a weight average molecular weight between 1000 and 1,000,000 Da; between 10,000 and 800,000 Da; or 100,000 and 600,000 Da.

"DADMAC" is used to refer to diallyl dimethyl ammonium chloride.

"DADMAC Polymer" is used to refer to a polymer comprising diallyl dimethyl ammonium chloride repeating subunits. DADMAC may be a homopolymer or a copolymer having one or more other repeating subunits, such as acrylamide and acrylamide-based units.

"Flocculating Agent" is used to refer to a composition that can be added to a liquid to destabilize and/or aggregate colloidal and finely divided suspended particles in the liquid. Flocculants and coagulants are examples of flocculating agents.

"Flocculant" is used to refer to a composition that can induce agglomeration of particles in a liquid carrier phase that are thermodynamically inclined to disperse. Agglomeration can be the result of weak physical forces such as surface tension and adsorption. Flocculation often involves the formation of discrete globules of particles, aggregated together with films of liquid carrier interposed between the aggregated globules. Flocculation includes those descriptions recited in ASTM E 20-85. Flocculants often have a low charge density and a high molecular weight (in excess of 1,000,000) which, when added to a liquid containing finely divided suspended particles, destabilizes and aggregates the solids through a mechanism of inter-particle bridging.

"Coagulant" is used to refer to a water treatment chemical often used in solid-liquid separation to neutralize charges of suspended solids/particles such that the suspended solids agglomerate. Coagulants can be categorized as inorganic coagulants, organic coagulants, and blends of inorganic and organic coagulants. Coagulants often have a higher charge density and lower molecular weight than flocculants. Often, when coagulants are added to a liquid containing finely divided suspended particles, the coagulants destabilize and aggregate the solids through a mechanism of ionic charge neutralization.

"Separation" is used to refer to a mass transfer process that converts a mixture of substances into two or more distinct outputs. At least one of the outputs is enriched in one or more of the mixture's substances. Separation includes but is not limited to such processes as:

adsorption, centrifugation, cyclonic separation, density based separation, chromatography, crystallization, decantation, distillation, drying, electrophoresis, elutriation, evaporation, extraction, leaching extraction, liquid-liquid extraction, solid phase extraction, flotation, dissolved air flotation, froth flotation, flocculation, filtration, mesh filtration, membrane filtration, microfiltration, ultrafiltration, nanofiltration, reverse osmosis, fractional distillation, fractional freezing, magnetic separation, precipitation, recrystallization, sedimentation, gravity separation, sieving, stripping, sublimation, vapor-liquid separation, winnowing, zone refining, and any combination thereof.

"Stable Emulsion" is used to refer to an emulsion in which droplets of a material are dispersed in a carrier fluid and repelled from each other by an energy barrier, where the droplets would otherwise merge such that two or more phase layers form. The energy barrier may be at least about 20 kT. The repulsion may have a half-life of at least a few years.

"DAF" is used to refer to Dissolved Air Flotation. DAF is often used to process wastewater streams. In a DAF process, air bubbles are injected into the wastewater in a flotation tank. The air bubbles attach to solid particulates in the wastewater and float them to the surface of the wastewater. The floated particulates may be skimmed off, for example by using an overhead belt-collector. DAF can be used to separate a sludge stream from the wastewater by dewatering the solids in the wastewater.

The term "about" is used here to refer to variation in the numerical quantity that can occur, for example, through typical measuring and liquid handling procedures used for making and transporting compositions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture or environmental conditions. Whether or not modified by the term "about", the claims include equivalents to the quantities.

The transitional phrase "consisting essentially of" as used in the claims and the disclosure limits the scope of the claim to the specified materials including only minor impurities or inactive agents that a person of ordinary skill in the relevant art would ordinarily associate with the listed components.

In the event that a dictionary definition for a term used in this disclosure is needed, the definitions in the Kirk-Othmer Encyclopedia of Chemical Technology, 5th Edition, (2005), (Published by Wiley, John & Sons, Inc.) shall control. Chemical structures presented in this disclosure also include all possible stereoisomer alternatives.

The present disclosure relates to compositions, methods, and systems for processing wastewater and sludge streams. In particular, the present disclosure relates to compositions, methods, and systems for decreasing the viscosity of a solids-containing material, such as sludge. Use of the compositions, methods, and systems may allow for handling sludge streams at a higher solids content than otherwise would be feasible or practical.

Figure 1:
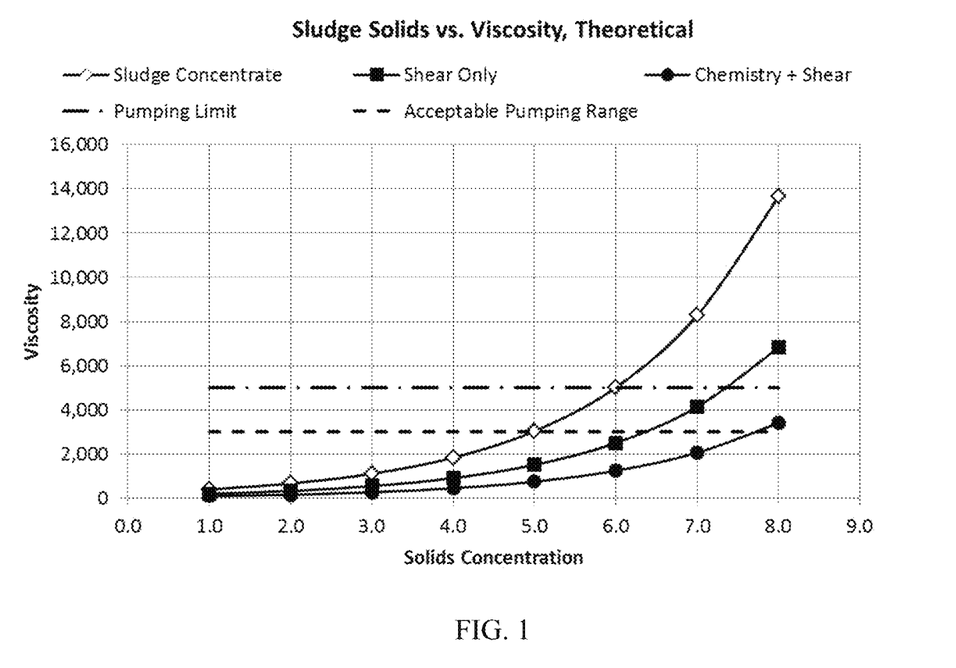
FIG. 1 is a graphical representation of the general principle that applies to the embodiments of the present disclosure.

The general principle and the correlation between sludge solids content and viscosity are illustrated in FIG. 1. While the correlations shown in the figure are based on experience with various sludges and treatments as described in this disclosure, the specific data points of the graph are theoretical. When the solids concentration of sludge increases, the viscosity increases exponentially, at some point crossing a practical limit for when handling of the sludge is still practically feasible. The practical limit can be a limit on the resources required to process the sludge (for example, energy or time required for pumping, or other constraints caused by viscosity and/or other rheological properties). This limit may be an objective limit (such as the maximum power setting of a pump), or may be a relative limit (such as commercial viability). By applying a treatment according to an embodiment, either a marginal benefit, or preferably an effective benefit, can be achieved, such that a higher solids content sludge can be handled without crossing the practical limit. For example, a sludge stream that otherwise would not be considered pumpable can be made pumpable by the present compositions and methods. Use of the compositions, methods, and systems may also allow for efficient disposal of wastewater by reducing the bulk of sludge separated from the wastewater. The bulk is reduced by dewatering or thickening the sludge. The viscosity of the thickened sludge can be reduced for a temporary or permanent period of time by shearing and optionally adding a chemical agent.

Although the present disclosure refers to wastewater and sludge, the methods, compositions, and systems disclosed here can be applied to any other suitable liquid stream or slurry, where reduction of viscosity is desired. For example, the methods, compositions, and systems may be applicable to various food processing, agricultural, or industrial streams that include a high solids content. It is hypothesized that the methods, compositions, and systems may be particularly applicable to streams that include high organic solids, or plant or animal (including microbial) cell material.

Wastewater is typically treated to remove contaminants and to prepare the wastewater for further handling, such as disposal or re-use. In order to discharge the water, the solids in the wastewater stream usually need to be separated from the water stream. For example, the wastewater stream may be separated into a treated water stream and a solids stream (e.g., sludge). The wastewater may initially have an equilibrium viscosity of less than 100 cP or less than 200 cP. The wastewater may undergo various treatments such as digestion, sedimentation/settling, filtration, oxidation, floatation (e.g., DAF), and polishing. A sludge stream may be formed and removed from the wastewater stream during one or more of these processes. For example, wastewater may be placed in a settling tank, where suspended solids in the wastewater gravitationally settle to the bottom of the tank and coalesce into sludge. Lighter suspended particles may also collect along the surface of the wastewater. During floatation (e.g., DAF), particles are caused to float to the surface with the use of gas bubbles. The floating particles may be skimmed off using an overhead belt-collector, and may be gathered into sludge.

In at least one embodiment, the sludge is formed when the wastewater is treated in an anaerobic digestion process. Anaerobic digestion in a sewage treatment facility can be used to reduce pathogens, reduce volume, and stabilize solids. The more stabilized the solids in the sludge are, the easier the sludge is to dewater. In an anaerobic digestion process, wastewater is placed in a closed tank. Because the closed tank has limited or no air flow, anaerobic biochemical processes occur. The anaerobic processes hydrolyze, acidify, or consume many organic and solid materials, converting them into methane gas, carbon dioxide gas, or other liquid or gaseous materials. Anaerobic digestion also produces sludge as a by-product of the process. Anaerobic digestion is often conducted at a mesophilic temperature between 70-110° F. The sludge may be removed from the tank through a valve. The more intense the anaerobic metabolic conditions, the more dewatering or thickening of the sludge occurs. The anaerobic digestion process may also include an additional liquid-solid separation process.

In one embodiment, the sludge is formed from the wastewater by, or is thickened or dewatered by a Dissolved Air Flotation (DAF) process.

In at least one embodiment, the sludge is formed from wastewater, or is thickened or dewatered by a secondary wastewater treatment process, e.g., as a by-product of a microorganism activated process. In such a process, wastewater is flowed into a basin and is allowed to remain there for a period of time (e.g., a pre-determined detention time). Particulates present in the wastewater are metabolized or degraded by microorganisms in the basin, producing a microbial floc (also known as activated sludge). Subsequently, the contents of the basin are flowed to a secondary settling tank. The microbial floc settles at the bottom of the secondary settling tank, where it is periodically or continuously removed as sludge from the effluent liquid. For a period of time, relative to the metabolic relationship between the sludge constituents and particular resident microorganisms, the longer the floc is present in the settling tank, the more thickened or dewatered the sludge becomes. The microorganism activated process may utilize an aerobic digestion process. In such an aerobic process, an aeration unit transfers gaseous air or oxygen, into contact with some or all of the contents of the basin. This furthers the metabolic activity of the organisms.

In some cases, it is industry practice to dilute the sludge with water prior to transporting or pumping the sludge. For example, the sludge may be diluted from 6-12% solids to 2-8% solids. Dilution allows for efficient pumping of the sludge, but causes more bulk to have to be transported or pumped. However, according to aspects of the present disclosure, the sludge solids content can be increased and the viscosity of the thickened sludge reduced, thus avoiding the need for dilution.

Dewatering the sludge and reducing its volume is desired. However, the solids content of sludge cannot always be made as high as the maximum solids content that is chemically or mechanically possible. When the solids content of the sludge is too high, the high viscosity renders the sludge's rheological properties incompatible with commercially feasible hauling and disposal methods. While it may be physically possible to pump sludge at a very high solids content (i.e., high viscosity), pumping very high solids sludge is slow and may not be practical. Also, if the viscosity is higher than the viscosity rating of a pump used to pump the sludge, the high viscosity sludge may cause pump failure and/or plugging of the system. In some processes that dispose of solids as sludge produced as a float in a DAF process, the sludge is collected and disposed of while it still has a solids content well below the full capability of the DAF process. In some instances, the DAF operation itself must come to a halt or must be considerably slowed down to keep the float sufficiently viscous to be pumped or otherwise handled.

Figure 2:
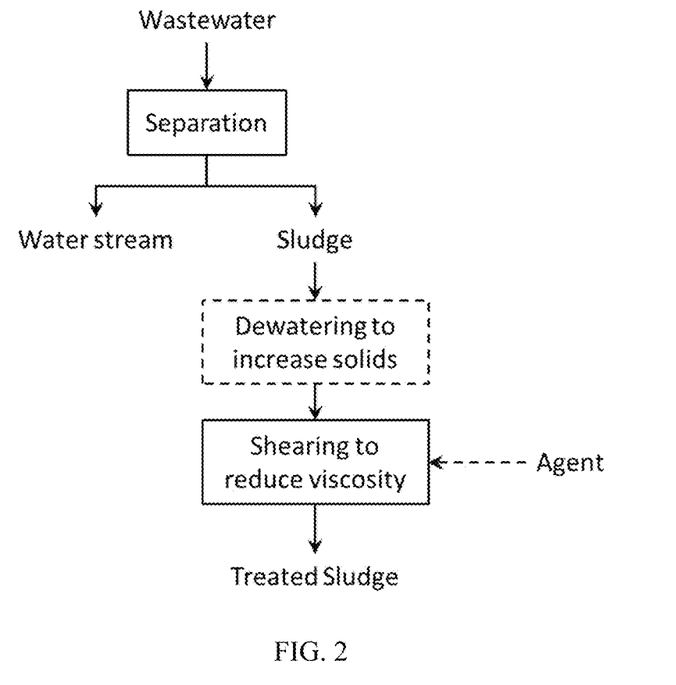
FIG. 2 is a flow chart of the method according to an exemplary embodiment.

According to embodiments of the present disclosure, the sludge may be thickened by removing water or liquid from the sludge to increase its solids content and to reduce bulk. The dewatered sludge can be further treated to reduce its viscosity. By concentrating the sludge and then reducing its viscosity, conventional pumping, hauling, and disposal methods can be used. By reducing the bulk of the sludge, less volume needs to be stored, transported, or disposed of. At least some embodiments of the present disclosure are directed to a method of transporting or disposing of waste material, such as wastewater or sludge separated from the wastewater. A schematic flow chart of the method according to an exemplary embodiment is shown in FIG. 2. Solid material from a wastewater stream may be separated to obtain sludge. The sludge may be further dewatered and its volume reduced in a dewatering process, resulting in an increase in total solids and thus increased viscosity. The viscosity of the sludge can then be reduced by subjecting the sludge to shearing. Optionally, one or more additives (e.g., chemical agents) may be added to the sludge. In an alternative embodiment, the sludge may be further dewatered after shearing. In some embodiments, the method results in a temporary reduction in viscosity of the sludge. In other embodiments, the viscosity of the sludge is permanently lowered. The treated sludge may be further stored, pumped, moved, transported and/or otherwise handled.

According to some aspects, the sludge may be thickened by removing at least 30% of its volume. Prior to thickening, the sludge may have had a viscosity of about 100 to about 10,000 cP, or about 300 to about 4,000 cP, or less than about 3,000 cP. Typical processes for thickening the sludge include DAF thickening, flocculating, coagulating, decanting, sun drying, oven drying, heating, and mechanical dewatering, such as pressing, centrifuging, filtering, or using any other suitable separation mechanism, and combinations thereof. The dewatering may also include the use of one or more chemicals, such as flocculants and coagulants.

In at least one embodiment, the sludge or wastewater is formed, thickened, or dewatered, in a mechanical or thermal dewatering process. For example, pushing wastewater against a membrane or filter will squeeze out water. Also, wastewater may be oven dried, sun dried, or heated, to evaporate or boil off water. Other mechanical dewatering devices include, for example, a belt press, centrifuge, rotary vacuum drum, screw press, plate and frame press, separation device, and any combination thereof.

In at least one embodiment, the sludge is formed, thickened, or dewatered, by the addition of a flocculant to the wastewater or to the sludge already separated from the wastewater. Depending on the flocculant used and the solids level, the flocculant may be added at a dosage of from about 1 to about 2,000 ppm, or from about 10 to about 1000 ppm. Suitable flocculants include cationic polymers, anionic polymers, nonionic polymers, amphoteric polymers, polyacrylamides, hydrolyzed polyacrylamides, copolymers of acrylic acid and acrylamide, polymethacrylamides, cationic polyelectrolytes, copolymers of acrylamide and acryloxyethyl trimethylammonium chloride (AETAC), quaternary ammonium compounds, and combinations thereof.

Representative examples of cationic polyelectrolytes include but are not limited to: polyphosphonium compounds, polysulfonium compounds, quaternary ammonium compounds, polymers of methacryloyloxyethyl trimethylammonium methyl sulfate (METAMS), polymers of methacrylamido propyl trimethylammonium chloride (MAPTAC), polymers of acryloyloxyethyl trimethyl ammonium chloride (AETAC), polymers of methacryloyloxyethyl trimethylammonium chloride (METAC), and polymers prepared from combinations of METAMS, MAPTAC, AETAC and/or METAC polymerized with acrylamide and/or methacrylamide, and any combination thereof. Representative examples of quaternary ammonium compounds include diethyl diallyl ammonium and dimethyl diallyl ammonium polymers and salts thereof.

The sludge may be formed, thickened, or dewatered by the addition of one or more coagulants to the wastewater or to the sludge already separated from the wastewater. Depending on the coagulant used and the solids level, the coagulant may be added at a dosage of about 1 to about 1,000 ppm, or from about 10 to about 500 ppm. Suitable coagulants include, for example, organic coagulants, inorganic coagulants, water soluble organic coagulants, poly (diallyldimethyl ammonium chloride), EPI-DMA, $NH_3$-crosslinked diallyl-N,N-disubstituted ammonium halide-acrylamide copolymers, polyaluminum chlorides, polymers of ethylene dichloride and ammonia, polymers of ethylene dichloride and dimethylamine, multifunctional amine polymers (such as condensation polymers of diethylenetriamine, tetraethylenepentamine, and hexamethylene diamine with ethylenedichloride), polymers made by condensation reactions such as melamine formaldehyde resins, cationically charged vinyl addition polymers, and any combination thereof.

Representative inorganic coagulants include, for example, alum, sodium aluminate, polyaluminum chloride (PAC), sulfated polyaluminum chloride, polyaluminum silica sulfate, ferric sulfate, ferric chloride, aluminum or iron salts (such as aluminum sulfate, aluminum chloride, ferric chloride, ferric sulfate, polyaluminum chloride, aluminum chloride hydrate, aluminum chlorohydrate), and any combination thereof.

Representative organic coagulants include, for example, positively charged polymeric compounds with low molecular weight, including but not limited to polyamines, polyquaternaries, polyDADMAC, epichlorohydrin-dimethylamine-ammonia polymers, and any combination thereof.

Representative cationically charged vinyl addition polymers include, for example, polymers and copolymers of diallyldimethylammonium chloride, dimethylaminoethyl methacrylate, dimethylaminoethylmethacrylate methyl chloride quaternary salt, methacrylamidopropyltrimethylammonium chloride, (methacryloxyloxyethyl) trimethyl ammonium chloride, diallylmethyl (beta-propionamido) ammonium chloride, (beta-methacryloxyloxyethyl) trimethyl-ammonium methyl sulfate, quatemized polyvinyllactam, dimethylamino-ethylacrylate, dimethylamino-ethylacrylate quaternary ammonium salts, and any combination thereof.

In at least one embodiment, the sludge is thickened or dewatered to increase its solids content (and thus viscosity) to a targeted amount. For example, the thickened sludge may have a total solids content of about 3 to about 35%, or about 5 to about 20%. In some cases, if the total solids content is mostly made up of suspended solids, the solids content may be about 6 to about 15%. The thickened sludge may have an equilibrium viscosity of about 1,000 to about 20,000 cP, about 2,000 to about 18,000 cP, or about 3,000 cP or higher. For example, the thickened sludge may have an equilibrium viscosity of about 1,000; 2,000; 3,000; 4,000; 5,000; 6,000; 7,000; 8,000; 9,000; or 10,000 cP. In some embodiments, prior to further treatment (e.g., viscosity reduction) the thickened sludge has an equilibrium viscosity of more than 3,000 cP. In some embodiments, the thickened sludge may have a consistency of a cake, i.e., a wet solid that may be stackable and crumbly or pasty.

The pH of the sludge depends on the source of the sludge and the wastewater, and the treatment used to treat and separate the wastewater and sludge. If necessary, the pH of the sludge may be adjusted using typical pH adjusting agents, such as acids or bases. In some embodiments, the pH of the sludge as it undergoes shear is between 3 and 8. In some embodiments, the method is free of pH adjustment steps other than a possible minor change in pH caused by the addition of the chemical additives.

According to embodiments, the sludge or thickened or dewatered sludge is treated by shearing. Shearing may be done by applying a mechanical shearing force to the sludge. The mechanical shearing force can be accomplished by agitation, vibration, sonic vibration, ultrasonic vibration, stirring, torque force, shaking, spinning, pumping, cavitation, maceration, homogenization, pressure changes, directional changes, velocity changes, material impacts, or any other rapid or violent force capable of rupturing or fragmenting the matrix structure of particulates in the sludge.

Without wishing to be bound by theory, it is believed that the rupturing or fragmentation temporarily deprives the matrix of hydrogen bonds, Van der Waals forces, cross-linkage effects, or other mechanisms that would otherwise impose a higher equilibrium viscosity on the sludge. The mechanical shearing force can be applied by, for example, blades, paddles, rollers, bars, valves, presses, rotating devices, a homogenizer, sonicator, or combinations thereof. In at least one embodiment, the shearing is performed by impact or stirring with a rotating blade or contact member. The rotating blade or contact member may spin at a speed of between 1 and 100,000 rpm, between about 10 and about 10,000 rpm, or between about 100 and about 1,000 rpm.

The shearing force may be applied for a time sufficient to impart a desired reduction in viscosity. For example, the shearing force may be applied for about 1 second to about 10 minutes, about 2 seconds to about 4 minutes, about 4 seconds to about 2 minutes (120 seconds), about 8 seconds to about 90 seconds, about 10 seconds, about 40 seconds, about 5 seconds, or about 10 seconds.

According to embodiments of the present disclosure, the viscosity of the treated sludge is lower such that the treated sludge can be pumped using a pumping force that would be insufficient to pump the sludge prior to treatment at its equilibrium viscosity. In at least one embodiment, no water or other diluting liquid is added to the sludge after the sludge has been sheared. The treated sludge may maintain a lowered viscosity for a period of time (e.g., at least about a few hours, a few days, or longer) without dilution.

In some embodiments, the treated sludge has a viscosity (the lowered viscosity or a second viscosity) that is lower than the viscosity prior to treatment ("equilibrium viscosity" or a first viscosity) by at least about 500 cP, 1,000 cP, 1,500 cP, 2,000 cP, 2,500 cP, 3,000 cP, 4,000 cP, 5,000 cP, 6,000 cP, 7,000 cP, 8,000 cP, or 10,000 cP. For example, the treated sludge may have a viscosity of about 100 to about 4,000 cP, about 200 to about 3,500 cP, about 300 to about 3,000 cP, about 400 to about 2,500 cP, or about 500 to about 2,000 cP. Preferably, the treated sludge has a viscosity of 3,000 cP or lower (e.g., about 1,000 to about 2,000 cP, or about 1,000 to about 1,500 cP). The treatment may eliminate the need to dilute the sludge with water, and therefore the treated sludge may have the same or similar solids content as the sludge prior to treatment.

In some embodiments, the lowered viscosity (e.g., the second viscosity) of the treated sludge persists for a period of time long enough for the sludge to be handled (e.g., pumped, transported, disposed, or reused). For example, the viscosity of the sludge may change less than about ±10%, about ±15%, about ±20%, ±25%, or about ±30% from the lowered viscosity (the second viscosity) during a period of at least 6 hours, 8 hours, 10 hours, 12 hours, 15 hours, 18 hours, 24 hours, 48 hours, or longer after treatment. In other words, the viscosity of the treated sludge after a period of time will be from about 90 to 110%, from about 85 to 115%, from about 80 to about 120%, from about 75 to about 125%, from about 70 to about 130%, or from about 50 to about 150% of the second viscosity. In at least one embodiment, the post-shear viscosity is lower than the equilibrium viscosity, and the lowered viscosity is retained for a period of time ranging from: 1 hour to 15 days, 1 to 12 hours, 3 to 12 hours, or at least 1 to 4 hours. In some embodiments, the viscosity of the treated sludge is lowered permanently or for at least about 30 days or longer. In some embodiments the treated sludge is thixotropic and the viscosity may revert to about 3,000 cP after 4 hours, 6 hours, 12 hours, 24 hours, 48 hours, or longer.

The method may further comprise adding one or more additives or chemical agents (including but not limited to viscosity reducing agents or dispersants) to the sludge. The additive may be added before, during, or after shearing. The additive may be selected such that it makes viscosity reduction faster than shearing alone, further lowers the viscosity of the treated sludge, and/or that it helps maintain the lowered viscosity of the treated sludge for a longer period of time. Suitable additives include, for example, detergents, polymer detergents, DADMAC, polymerized DADMAC, acrylic-based polymers, tetrasodium pyrophosphate (TSPP), trisodium phosphate, polyacrylate-acrylic acid polymers, polyacrylate terpolymers, sodium salt acrylic polymers, polymethacrylic acid, acrylic acid polymers, zirconium oxychloride, acrylic acid ethyl acrylate copolymer, dimethylamine-epichlorohydrin copolymer, acrylic polymer, polyacrylate copolymer, zirconium basic sulfate (ZrBS), surfactants, flocculants, rheology modifying polymers, dispersants, and any combination thereof.

Suitable polymer additives include, for example, homopolymers, copolymers, cationic polymers, anionic polymers, amphoteric polymers, hydrophobic (in full or in part) polymers, hydrophilic (in full or in part) polymers, and any combination thereof. The polymers may comprise sulfonated subunits, aromatic subunits, positively charged subunits, negatively charged subunits, and any combination thereof. The polymers may have a molecular weight between about 1,000 and about 1,000,000 Da. The polymers may be in a dry (solid or powder) form or in a liquid (solution or suspension) form. In at least one embodiment, the agent is a copolymer where each of the constituent subunits comprises an amount of between 1% and 99% of the total number of polymer units.

In at least one embodiment, the sludge or wastewater is treated with polyaspartic acid. In at least one embodiment, the wastewater or sludge is not contacted with any, with substantially any, or with essentially any polyacrylic acid during the any of its treatments.

The agents may be dosed into the sludge in an amount that achieves the desired change in viscosity. For example, the agents may be dosed from about 100 ppm to about 50,000 ppm, from about 500 to about 30,000 ppm, from about 750 to about 20,000 ppm, from about 1,000 to about 10,000 ppm, or from about 2,000 to about 5,000 ppm. The agents may be dosed based on the total mass of the sludge or based on the mass of the solids in the sludge. The type and amount of agent can be selected based on the components and properties of the wastewater or sludge.

Due to the varying properties of sludge, the sludge may in some instances be dewatered by shearing and without the use of a chemical. However, in most cases, mere shearing may not be sufficient to thin the sludge enough, or will have only a short-term effect on the viscosity of the sludge. Various sludge types may also need a different coagulant/dispersant chemistry. Applicants have found that in some instances, an anionic dispersant will work better, whereas in other instances a cationic dispersant will work better.

In some embodiments, the treated sludge is stored or transported for reuse or disposal. The treated sludge may be loaded within a storage or transport container. Such loading may be performed by pumping, conveying (e.g., by belt conveyor or auger conveyor), by hand or tool loading (e.g., shoveling), or by any other suitable loading method, either automated or manual. In preferred embodiments, the sludge has a consistency that can be delivered by pumping.

The storage or transport container can be a storage tank, storage vessel, bag, biodegradable bag, tanker truck, or truck trailer tank. In at least one embodiment, the container is loaded with the treated sludge, the container (containing the treated sludge) is transported to a disposal site, and arrives at the disposal site (e.g., a land application site or a landfill) before the viscosity of the treated sludge rises to a level which precludes efficiently or effectively pumping the sludge out of the container. In at least one embodiment, the container arrives at the disposal site for the sludge before the treated sludge has returned to its equilibrium viscosity. For example, the method may further comprise removing the sludge from the container before the viscosity of the sludge increases to above 3,000 cP.

In some embodiments the container is constructed for receiving the treated sludge in a low viscosity form and for disposing of the treated sludge in a higher viscosity form. For example, the container may have more than one opening including at least one amenable for lower viscosity loading (for example a pump inlet), and at least one amenable for high viscosity unloading (for example a hatch opening). In at least one embodiment, the transport container (such as a dump truck) is constructed and arranged to use gravity to remove the sludge from the container.

The sludge may be transported in the container to, for example, a landfill, a fertilizer storage site, a pile of fertilizer, a farm, an offshore body of water, an incinerator, or any other suitable disposal or reuse site.

In at least one embodiment the container itself is disposed of, along with the treated sludge, at the disposal site. To facilitate this, the container may be substantially or entirely constructed out of a material that will undergo degradation or decomposition at the disposal site.

The foregoing may be better understood by reference to the following examples. The examples demonstrate representative exemplary embodiments according to the present disclosure.

EXAMPLES

Example 1

Various chemistries were considered and evaluated in a screening study to find suitable chemical agents for use in the present method. An initial list of 73 chemicals was narrowed down based on environmental considerations to 56 chemicals to be tested in laboratory trials. The 56 chemicals included 18 anionic, 14 cationic, 17 non-ionic, and 7 experimental compounds.

A DAF float sample was obtained from a fluid milk plant and was pre-thickened through a manual dewatering step. All tested chemical agents were added at the same concentration, 2,000 ppm, to 600 mL samples without pH adjustment, and the samples were sheared at 10,250 rpm for 120 seconds. The shear mixer was a SILVERSON® Model LSMA. The treated samples were compared against a control sample that was sheared but did not receive a chemical agent.

Figure 3:
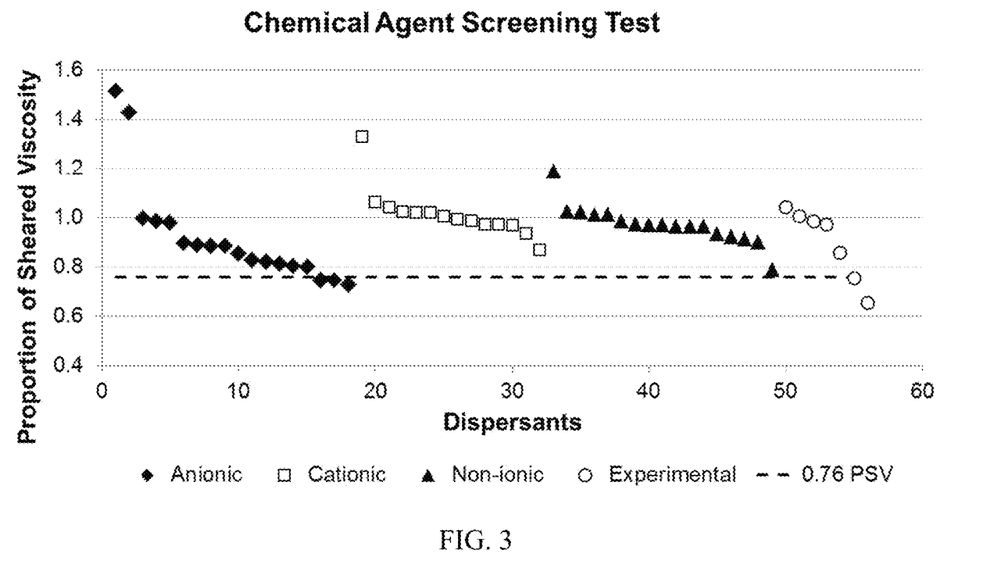
FIG. 3 is a graphical representation of the results of a screening test in Example 1.

The shearing alone reduced the viscosity of the sample by 52%. The viscosity of the treated samples was compared against the control (shearing only, no chemical additive) by calculating the Proportion of Sheared Viscosity (PSV) for each sample as PSV=viscosity of test sample/viscosity of control sample. The results are shown graphically in FIG. 3. The graph includes a threshold viscosity reduction value of 0.76 PSV that was desired to be reached by the treatment.

It was observed that the best-performing chemical agents were able to reduce the viscosity of the treated samples by 25-35% from the viscosity of the control (PSV from about 0.65 to about 0.76). These agents were selected for further testing.

In a second phase of screening, the selected chemical agents at various process parameters were tested using a statistical experimental design (Design of Experiment or DoE). Different dispersant dosages, shear times, and pH levels were tested, and the viscosity of the samples was observed for a 7 day period. The ability of the method to treat sludge samples from different food plants was tested in a third phase of screening.

A summary of the results from all phases of screening is presented in TABLE 1. Two flocculants were identified for thickening the sludge samples, and two dispersants were identified for viscosity reduction.

TABLE 1

Use of Method on Samples from Various Sources

| Parameter | | Sample Source (Plant Type) | | | | |
| --- | --- | --- | --- | --- | --- | --- |
| | | Fluid Milk | Ice Cream | Cheese | Lactose | Poultry |
| Initial Solids Content | (wt-%) | 2.0 | 6.4 | 3.8 | 2.1 | 5.9 |
| Flocculant | | cationic flocculant | anionic flocculant | cationic flocculant | cationic flocculant | cationic flocculant |
| Flocculant Dose | (ppmv) | 165 | 196 | 425 | 278 | 227 |
| Volume Reduction | (%) | 61 | 40 | 45 | 50 | 25 |
| pH of Thickened Float | | 7.0 | 4.5 | 7.0 | 4.5 | 7.0 |
| Dispersant | | AAEA | DMA-ECH | DMA-ECH | DMA-ECH | AAEA |
| Dispersant Dose | (ppmv) | 2000 | 1000 | 1000 | 2000 | 1000 |
| Viscosity Reduction | (%) | 60 | 30 | 55 | 65 | 40 |
| Viscosity Reduction after 7 days | (%) | 50 | 30 | 65 | 55 | 30 |

It was observed that the method could be used to reduce volume of sludges from various sources, and to reduce the viscosity of the reduced-volume sludge. Viscosity reduction was maintained for at least seven days post treatment.

Examples 2-5

Sludge samples were obtained from various food processing plants for Examples 2-5. The samples were prepared by thickening by adding a flocculant and dewatering. The volume of the samples was reduced by between 25% and 62%.

The samples were treated by adding a chemical agent and by shearing the samples using a Silverson L5MA mixer for various time intervals ranging from 10 seconds to 120 seconds. The agents used in the treatments are listed in TABLE 2 below.

TABLE 2

Chemical Agents.

| Chemical Agent | Abbreviation |
| --- | --- |
| Acrylic Acid - Ethyl Acrylate Copolymer | AAEA |
| Blend of Acrylic Polymers | AP Blend |
| Dimethylamine - Epichlorohydrin Copolymer in Water | DMA-ECH |
| Acrylamide - Acrylic Acid Copolymer in Water | AAA |
| Zirconium Basic Sulfate | ZrBS |

Viscosity of the samples was determined with a Brookfield viscometer (LVDV-I+), which was calibrated against two viscosity standards, 987 cP and 13080 cP.

Example 2

The effect of shearing using various shear times and adding an agent to a sludge sample were evaluated.

Sludge samples were prepared from wastewater collected from a milk processing plant. The wastewater was divided into samples and treated with 750 ppm of cationic flocculant. The samples were decanted to remove excess water and to thicken the samples. The resulting sludge had 38% less water volume than the initial wastewater.

A control sample received no agent and no shearing. Samples 1A-1D were sheared without the addition of agent. Samples 1E-1G were sheared and received an agent (ZrBS) at various dosage levels prior to shearing. The viscosity of each of the samples was measured. The results are shown in TABLE 3.

TABLE 3

Effect of Shearing and Agent on Viscosity

| Sample # | Treatment | Viscosity 120 sec (cP) |
| --- | --- | --- |
| Control | No treatment | 7560 |
| 1A | Shear 30 sec | 2048 |
| 1B | Shear 60 sec | 1848 |
| 1C | Shear 120 sec | 1508 |
| 1D | Shear 300 sec | 1676 |
| 1E | Shear 120 sec; 5,000 ppm ZrBS | 1640 |
| 1F | Shear 120 sec; 10,000 ppm ZrBS | 1744 |
| 1G | Shear 120 sec; 20,000 ppm ZrBS | 1212 |

It was observed that shearing the sludge reduced viscosity from over 7,500 cP to about 2,000 cP or below. While increasing the shear time from 30 s to 120 s lowered the viscosity, no further improvement was observed when shear time was increased from 120 s to 300 s. Comparing sample 1C (120 s shear without agent) with samples 1E, 1F, and 1G (120 s shear with agent), it was observed that ZrBS at a lower dosage caused an increase in viscosity, and at a higher dosage caused a decrease in viscosity relative to shearing without additives.

Example 3

The effects of various agents and dosages on viscosity were tested. Further, the viscosity of some of the samples was tested over time to determine thixotropic effects of the treatment.

Samples were prepared from DAF float from a cheese processing plant. The float had an initial viscosity of 324 cP. Sludge samples were prepared by adding 425 ppm of flocculant to the float and manually dewatering, reducing the volume of the samples by 45%. The resulting sludge had a viscosity of 6500 cP.

The sludge was divided into 600 mL samples 2A-2D. A control was sheared but received no agent. Samples 2A and 2B received a dosage of AP Blend (1,000 ppm and 2,000 ppm, respectively) and were sheared. Samples 2C and 2D received a dosage of DMA-ECH (1,000 ppm and 2,000 ppm, respectively) and were sheared. Shearing was done for 120 s at 10,250 rpm. The viscosity of all of the samples was measured immediately after treatment, and of samples 2B and 2D at various time intervals. The results are shown in TABLE 4.

TABLE 4

Effect of Shearing, Agent, and Time on Viscosity

| | | Viscosity (cP) | | | | |
| --- | --- | --- | --- | --- | --- | --- |
| Sample # | Chemical Agent | 0 h | 67 h (# 2.3) 66 h (# 2.5) | 115 h (# 2.3) 113 h (# 2.5) | 140 h (# 2.3) 138 h (# 2.5) | 170 h (# 2.3) 168 h (# 2.5) |
| Control | None | 2912 | | | | |
| 2A | AP Blend 1,000 ppm | 2556 | | | | |
| 2B | AP Blend 2,000 ppm | 2464 | 2324 | 2136 | 2236 | 2884 |
| 2C | DMA-ECH 1,000 ppm | 1312 | | | | |
| 2D | DMA-ECH 2,000 ppm | 632 | 716 | 740 | 748 | 768 |

It was observed that DMA-ECH resulted in a significantly lower viscosity than the AP Blend or shear only. The viscosity of sample 2B treated with AP Blend initially decreased during the first 115 hours or testing. The viscosity of sample 2D treated with DMA-ECH began increasing already during the first time interval (66 h).

Example 4

The effect of DMA-ECH on viscosity was compared to AAEA.

Sludge was prepared from DAF float as in Example 2. The sludge was divided into 600 mL samples 3A-3C. A control received no agent and no shearing. Samples 3A-3C were sheared for 120 seconds at 10,250 rpm. DMA-ECH and AAEA were dosed at 2,000 ppm into samples 3B and 3C, respectively. The results are shown in TABLE 5.

TABLE 5

Effect of DMA-ECH and AAEA on Viscosity

| Sample # | Treatment | Viscosity (cP) |
|---|---|---|
| Control | No treatment | 6500 |
| 3A | Shear 120 sec | 2912 |
| 3B | Shear 120 sec; DMA-ECH 2,000 ppm | 1048 |
| 3C | Shear 120 sec; AAEA 2,000 ppm | 2336 |

It was observed that adding a dispersant provided a greater reduction in viscosity than shearing only. DMA-ECH provided a greater reduction in viscosity than AAEA.

Example 5

The effect of DMA-ECH on viscosity was compared to AAA.

Samples were prepared from DAF float from a milk processing plant. Sludge samples were prepared by thickening the DAF float.

The sludge was divided into 600 mL samples that were dosed with either DMA-ECH or AAA at either 1000 ppm or 4000 ppm and sheared for 120 s at 10,250 rpm. The viscosity of the samples was measured at various time intervals. The results are shown in TABLE 6 and FIG. 4 as the ratio of the treated sample to a control (non-treated) sample (shown as PSV or "proportion of sheared viscosity"). Low PSV values indicate a greater difference and thus a greater reduction in viscosity, whereas higher values indicate a lesser reduction in viscosity and a value of 1 would indicate no reduction in viscosity.

Figure 4:
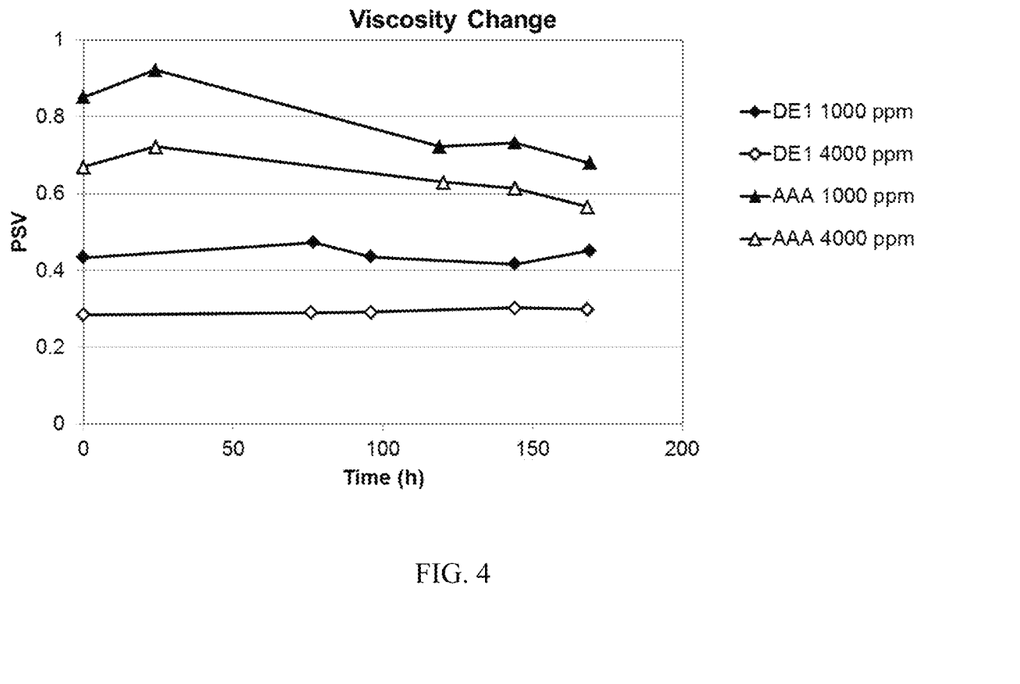
FIG. 4 is a graphical representation of viscosity reduction in Example 5.

The data in FIG. 4 shows that even at the lower concentration of 1,000 ppm, DMA-ECH lowered the viscosity of the sludge more than AAA at 4,000 ppm.

TABLE 6

Effect of Dispersant on Viscosity

| Dosage (ppm) | Dispersant | Time (h) | PSV |
|---|---|---|---|
| 1000 | DMA-ECH | 0 | 0.43 |
| 1000 | DMA-ECH | 77 | 0.47 |
| 1000 | DMA-ECH | 96 | 0.44 |
| 1000 | DMA-ECH | 144 | 0.42 |
| 1000 | DMA-ECH | 169 | 0.45 |
| 4000 | DMA-ECH | 0 | 0.29 |
| 4000 | DMA-ECH | 76 | 0.29 |
| 4000 | DMA-ECH | 96 | 0.29 |
| 4000 | DMA-ECH | 144 | 0.30 |
| 4000 | DMA-ECH | 168 | 0.30 |
| 1000 | AAA | 0 | 0.85 |
| 1000 | AAA | 24 | 0.92 |
| 1000 | AAA | 119 | 0.72 |
| 1000 | AAA | 144 | 0.73 |
| 1000 | AAA | 169 | 0.68 |
| 4000 | AAA | 0 | 0.67 |
| 4000 | AAA | 24 | 0.72 |
| 4000 | AAA | 120 | 0.63 |
| 4000 | AAA | 144 | 0.61 |
| 4000 | AAA | 168 | 0.57 |

Examples 6A and 6B

Two field trials were conducted to further test and optimize the process in real-life conditions. The first field trial (Example 6A) focused primarily on volume reduction, and the second field trial (Example 6B) on viscosity reduction. The two trials were both performed at a cheese plant, where sludge float was obtained from the plant's Dissolved Air Flotation (DAF) unit. The DAF unit is used to remove suspended solids from a mixture of anaerobically treated high strength waste and low strength process wastewater from the dairy plant.

Example 6A

The sludge float was conditioned for thickening by dosing anionic flocculant at a dose of about 10 lbs per ton of dry solids (about 0.5% on a dry weight basis). The thus conditioned sludge was fed to a Rotary Drum Thickener (RDT) at a flow rate of about 2 gpm. The RDT was a BDP industries 30"×5' model rotary drum thickener, and was operated at low speed of about 2 rpm (10 Hz on the variable frequency drive) with 100% of drum filtration area in service.

Figure 5A:
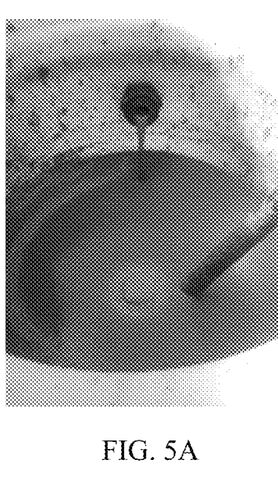
FIGS. 5A-5C are photographs of samples in various stages of processing during Example 6A.
Figure 5B:
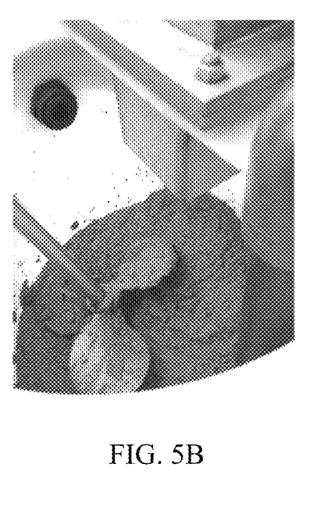

The average solids concentration of the incoming DAF float during the trials was 6.2 wt-% with a viscosity of about 700 cP. The consistency of the DAF float is shown in FIG. 5A. The thickened sludge (output of the RDT), shown in FIG. 5B, had a dry stackable texture at 12.1 wt-% solids with a viscosity of about 16,400 cP. The thickened sludge cannot be pumped with typical DAF float transfer and land application equipment.

Figure 6:
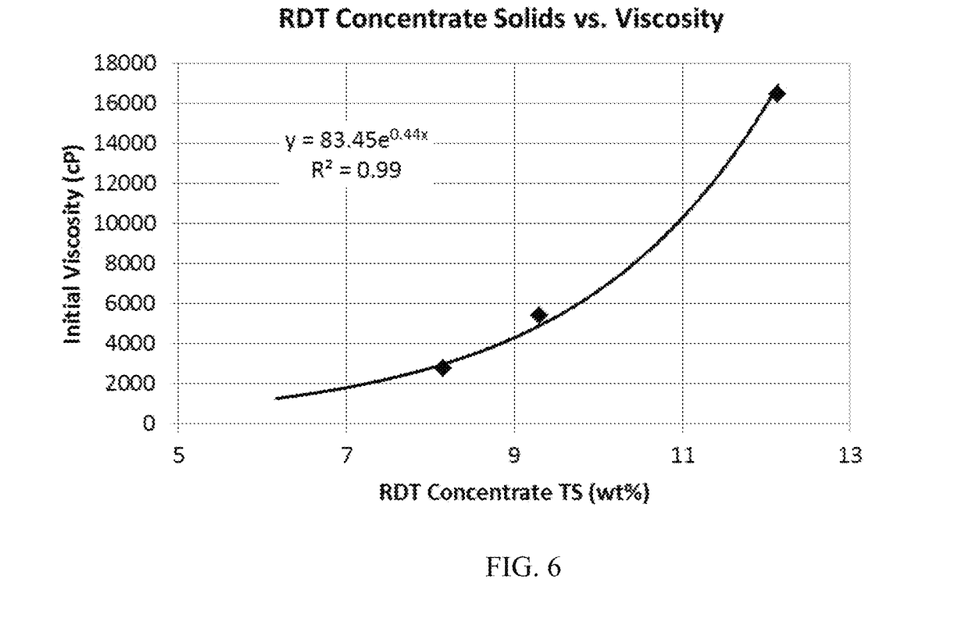
FIG. 6 is a graphical representation of the results of Example 6A.

The trial confirmed that reducing the DAF float volume by roughly 50% was achievable. However, when the solids content in the material is increased, viscosity quickly increases to levels that are difficult to handle and cannot be pumped. The relation between solids concentration and viscosity for a range of RDT outputs is shown in FIG. 6.

The RDT concentrate was further treated by adding cationic dispersant (DMA-ECH) at a dose of 2,000 ppm and shearing. After dosing the dispersant, the RDT concentrate was pumped through the shear mixer at about 1 gpm for up to 6 sequential passes. The duration of one pass was determined by the volume of RDT concentrate to be processed, ranging from 6 to 10 minutes. The shear mixer was a Silverson Model 150L with an SQHS work head, operating at a speed of 3,600 rpm and a nominal flow capacity of about 1 gpm.

Figure 5C:
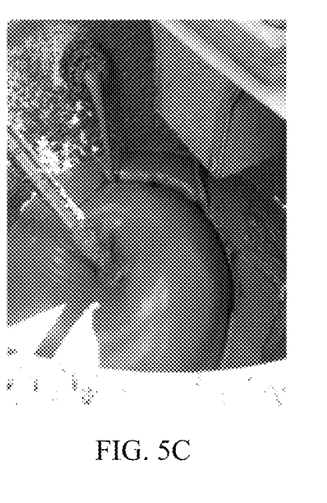

The viscosity of the sheared RDT concentrate was found to generally fall below 3,000 cP after 1 or 2 passes of the shear mixer, and to decline further during subsequent storage. The treated sludge (before subsequent storage) is depicted in FIG. 5C. It was concluded that the sludge float could be concentrated two fold, and the viscosity of the concentrated material reduced back to a pumpable consistency.

Example 6B

The sludge used in the second field trial contained mostly DAF float, mixed with smaller volumes of fluid residuals from within the plant wastewater treatment facility, and stored in a storage tank. The dilution of DAF float together with the storage time in the sludge holding tank caused the sludge flocculation characteristics to change. The average solids concentration of the sludge from the sludge holding tank during the trials was 5.2 wt-% and was more variable than the DAF float solids concentration in EXAMPLE 6A. The viscosity of the sludge ranged from 12 cP to 354 cP, with average viscosity of 69 cP and median viscosity of 44 cP.

Figure 7:
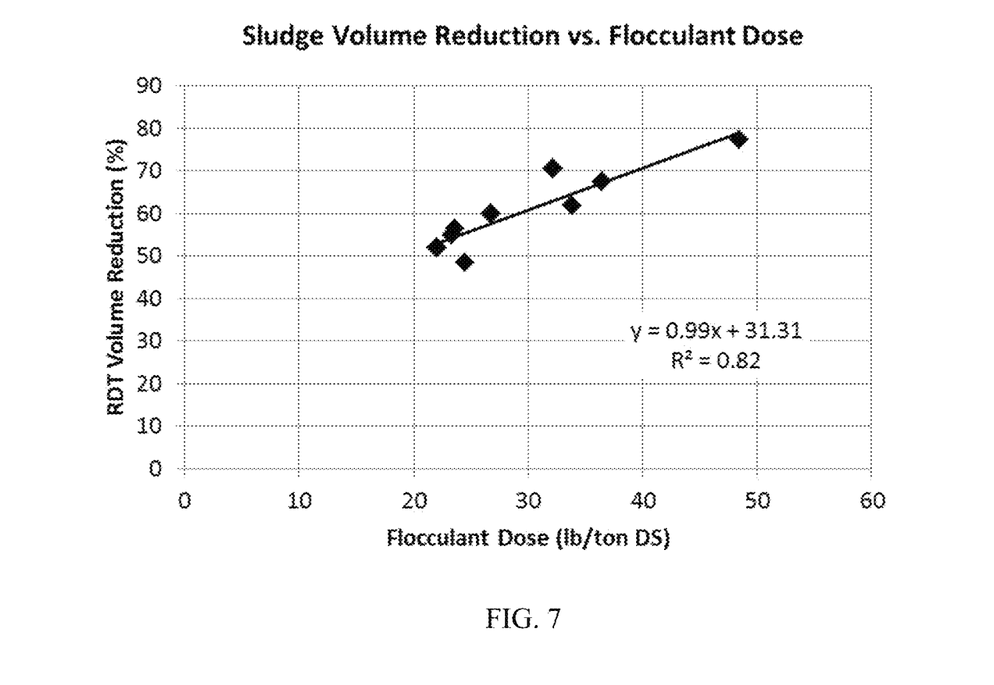
FIG. 7 is a graphical representation of sludge volume reduction in Example 6B.

Conditioning for thickening this time required cationic flocculant at a dose of about 25 lbs per ton of dry solids (about 1.25% on a dry weight basis). The sludge was thickened in a RDT as in EXAMPLE 6A. Various doses of flocculant were tested. The volume reduction through the RDT as function of flocculant dose is shown in FIG. 7. The solids concentration of the RDT concentrates varied between 10 and 14 wt % with viscosities ranging from 10,000 to 25,000 cP. It was confirmed that the volume of sludge from the sludge holding tank could be reduced by at least 50%.

Viscosity reduction was tested by adding cationic dispersant (DMA-ECH, "8105"), which was found to be the most effective for conditioning this RDT concentrate, and shearing. The shear mixer and shear conditions were the same as described in EXAMPLE 6A. In order to study the impact of dispersant dose on the achievable viscosity reduction with the shear mixer, four different dispersant concentrations were evaluated. The concentrations were 0, 500, 1,000, and 2,000 ppm, and were applied into the concentrate holding tank. The thus conditioned RDT concentrates were pumped through the shear mixer at about 1 gpm for up to 3 sequential passes.

Figure 8:
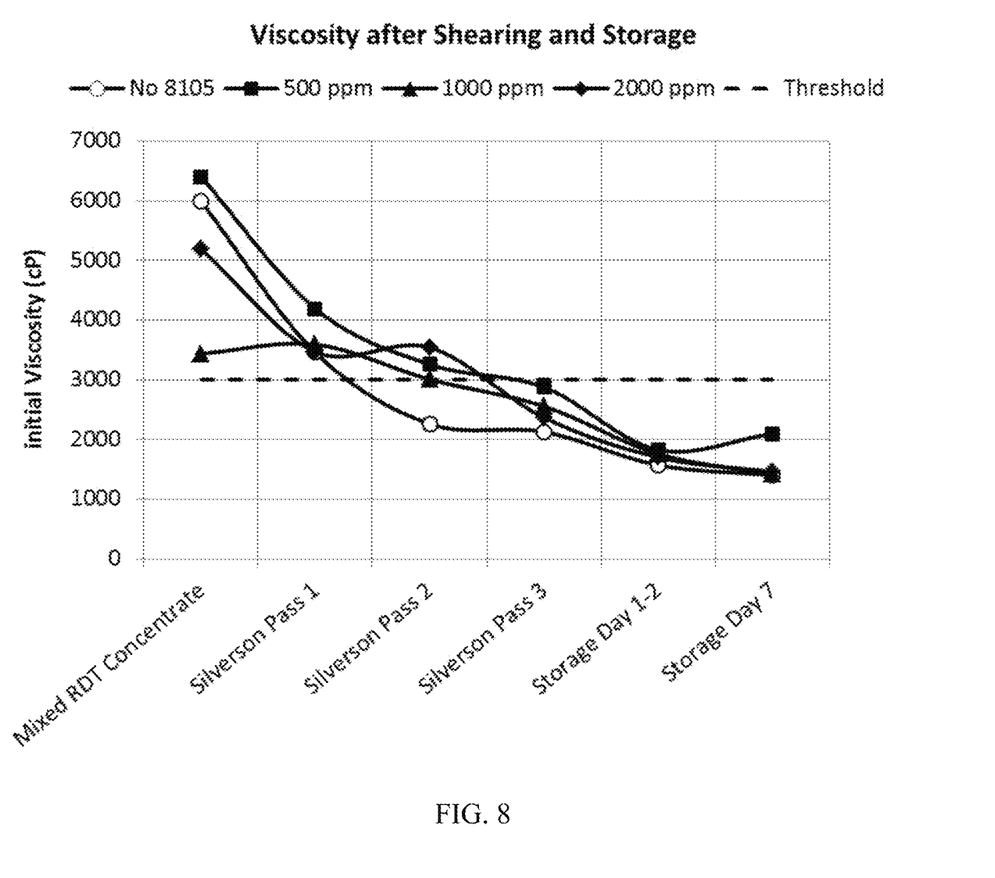
FIG. 8 is a graphical representation of viscosity reduction in Example 6B.

Results of the viscosity reduction are shown in FIG. 8. It was observed that for this RDT concentrate, unlike in Trial 1, dispersant was not required to achieve and maintain a sheared viscosity of less than 3,000 cP. The viscosity of sheared RDT concentrate generally fell below 3,000 cP after 2 or 3 passes, and declined further during subsequent storage.

The above disclosure is intended to be illustrative and not exhaustive, and is not intended to limit the invention to the particular embodiments disclosed. In addition, the invention encompasses any possible combination that also specifically excludes any one, or some, of the various embodiments described here. This description will suggest many variations and alternatives to one of ordinary skill in this art. All these alternatives and variations are intended to be included within the scope of the claims. Those familiar with the art may recognize other equivalents to the specific embodiments described here, which equivalents are also intended to be encompassed by the claims.

All ranges and parameters disclosed herein are understood to encompass any and all subranges included therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

The invention claimed is:

1. A method for treating sludge, the method comprising:
treating wastewater using dissolved air flotation to generate sludge comprising solids and water;
adding a cationic flocculating agent to the sludge and using gravity to separate at least some solids from the water to obtain a thickened sludge having a first viscosity of from about 3,000 cP to about 15,000 cP and a pH between 3.0 and 7.0;
shearing the thickened sludge to obtain a treated sludge having a second viscosity of less than 3,000 cP and a solids content of about 3 to about 15%, and
adding a cationic chemical agent to the thickened sludge before or during shearing,
wherein the thickened sludge is not diluted as part of the shearing and wherein the second viscosity persists for a period of at least 10 hours.

2. The method of claim 1 in which the gravity separation removes at least 30% of the sludge volume.

3. The method of claim 1, wherein the first viscosity is 5,000 cP or higher.

4. The method of claim 1, wherein the first viscosity is 7,000 cP or higher.

5. The method of claim 1, wherein the second viscosity is 2,000 cP or lower.

6. The method of claim 1, wherein the second viscosity is from about 500 cP to about 1,500 cP.

7. The method of claim 1, wherein the cationic chemical agent is selected from DADMAC, polymerized DADMAC, acrylic-based polymers, zirconium oxychloride, dimethylamine-epichlorohydrin copolymer, zirconium basic sulfate, and combinations thereof.

8. The method of claim 7, wherein the cationic chemical agent comprises dimethylamine-epichlorohydrin copolymer.

9. The method of claim 1, wherein the cationic chemical agent is selected from zirconium oxychloride, dimethylamine-epichlorohydrin copolymer, zirconium basic sulfate, and combinations thereof.

10. The method of claim 1, wherein the cationic chemical agent is added at about 100 ppm to about 10,000 ppm.

11. The method of claim 1, wherein the treated sludge maintains a viscosity that is from 50% to 150% of the second viscosity for 48 hours or longer.

12. The method of claim 1, wherein the treated sludge maintains a viscosity that is from 70% to 130% of the second viscosity for 120 hours or longer.

13. The method of claim 1 further comprising pumping the treated sludge.

14. The method of claim 13, further comprising pumping the treated sludge into a container.

15. The method of claim 14, wherein the container is selected from a tank, a tanker truck, bag, biodegradable bag, a dump truck, and a truck trailer tank.

16. The method of claim 14, further comprising transporting the treated sludge in the container.

17. The method of claim 14, further comprising removing the treated sludge from the container, wherein the treated sludge maintains a viscosity below 3,000 cP.

18. The method of claim 1, wherein the wastewater is from food manufacturing, restaurant waste, pharmaceutical manufacturing, pesticide manufacturing, paper manufacturing, municipal wastewater, cooling water, or agricultural wastewater.

* * * * *